United States Patent
Yen et al.

(10) Patent No.: US 8,593,435 B2
(45) Date of Patent: Nov. 26, 2013

(54) OPTICAL TOUCH APPARATUS WITH HIGH RESOLUTION AND METHOD OF OPERATING THE SAME

(75) Inventors: Meng-Shin Yen, Taipei (TW); William Wang, Taoyuan (TW); Chung-Cheng Chou, Taoyuan (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 232 days.

(21) Appl. No.: 12/813,246

(22) Filed: Jun. 10, 2010

(65) Prior Publication Data
US 2011/0012868 A1  Jan. 20, 2011

(30) Foreign Application Priority Data
Jul. 16, 2009  (TW) ................... 98124115 A

(51) Int. Cl.
*G06F 3/042* (2006.01)
(52) U.S. Cl.
USPC ........................................ 345/176; 178/18.09
(58) Field of Classification Search
CPC .............................. G06F 3/0421; G06F 3/0317
USPC .......................................... 345/176; 178/18.09
See application file for complete search history.

(56) References Cited

U.S. PATENT DOCUMENTS

| | | | |
|---|---|---|---|
| 5,914,709 A * | 6/1999 | Graham et al. | 345/176 |
| 6,351,260 B1 * | 2/2002 | Graham et al. | 345/176 |
| 6,538,644 B1 * | 3/2003 | Muraoka | 345/176 |
| 6,597,348 B1 * | 7/2003 | Yamazaki et al. | 345/175 |
| 6,972,753 B1 * | 12/2005 | Kimura et al. | 345/175 |
| 7,099,553 B1 * | 8/2006 | Graham et al. | 345/175 |
| 7,265,748 B2 * | 9/2007 | Ryynanen | 345/175 |
| 7,352,940 B2 * | 4/2008 | Charters et al. | 345/176 |
| 7,412,119 B2 * | 8/2008 | Smits | 345/176 |
| 7,656,391 B2 * | 2/2010 | Kimura et al. | 345/173 |
| 7,786,983 B2 * | 8/2010 | Graham | 345/175 |
| 2002/0175901 A1 * | 11/2002 | Gettemy | 345/175 |
| 2005/0128190 A1 * | 6/2005 | Ryynanen | 345/173 |
| 2005/0271319 A1 * | 12/2005 | Graham | 385/14 |
| 2006/0001653 A1 * | 1/2006 | Smits | 345/176 |
| 2006/0066537 A1 * | 3/2006 | Kimura et al. | 345/76 |
| 2006/0114244 A1 * | 6/2006 | Saxena et al. | 345/175 |
| 2006/0188196 A1 * | 8/2006 | Charters et al. | 385/32 |
| 2007/0024598 A1 * | 2/2007 | Miller et al. | 345/175 |
| 2007/0097097 A1 * | 5/2007 | Liao | 345/175 |
| 2007/0171212 A1 * | 7/2007 | Sakurai et al. | 345/177 |
| 2008/0007540 A1 * | 1/2008 | Ostergaard | 345/176 |
| 2008/0074402 A1 * | 3/2008 | Cornish et al. | 345/176 |
| 2008/0266266 A1 * | 10/2008 | Kent et al. | 345/173 |
| 2009/0225059 A1 * | 9/2009 | Juni | 345/175 |

FOREIGN PATENT DOCUMENTS

JP  05-080935  *  4/1993  ............ G09G 3/033

\* cited by examiner

*Primary Examiner* — Adam J Snyder

(57) ABSTRACT

An optical touch apparatus includes an inputting interface, an optical module, a light receiving module, and a processing module. The inputting interface includes a surface and a light transmitting unit under the surface. The optical module and the light receiving module are set on a first side and a second side of the inputting interface. The optical module receives an incident beam and generates a plurality of parallel sensing lights according to the incident beam. When the plurality of parallel sensing lights pass the light transmitting unit to the light receiving module, the light receiving module generates a sensing result according to the condition the light receiving module receives the plurality of sensing lights. The processing module determines a touch point position formed on the surface according to the sensing result.

12 Claims, 6 Drawing Sheets

OPTICAL TOUCH APPARATUS WITH HIGH RESOLUTION AND METHOD OF OPERATING THE SAME

BACKGROUND OF THE INVENTION

1. Field of the Invention

The present invention relates to a touch apparatus, and more particularly, to an optical touch apparatus capable of effectively decreasing the number of light emitters/light receivers and the spaces they occupied to increase the distribution density of the sensing lights and operating method thereof.

2. Description of the Prior Art

In general, the current touch apparatus, such as a resistance touch apparatus, a capacitance touch apparatus, and an optical touch apparatus, can detect one touch point or more touch points through different detection theorems or ways. In the various types of touch apparatus mentioned above, because the optical touch apparatus has a characteristic of good transmittance; it has become another well-used technology different from the resistance touch apparatus and the capacitance touch apparatus.

However, the conventional optical touch apparatus must have many light source emitters and light receivers set around the panel to detect touch points, as shown in FIG. 1, the conventional optical touch apparatus includes a panel 14, light emitters 10a~10d, and light receivers 12a~12d. Since the volumes of these light emitters 10a~10d and light receivers 12a~12d are not small, so that additional space requirement of the entire optical touch apparatus 1 will be caused, the volume of the conventional optical touch apparatus 1 can not be reduced, the manufacturing cost will be also huge, and the conventional optical touch apparatus 1 also fails to achieve touch point detection with high resolution.

Recently, the triangulation measurement method is applied to the optical touch technology to detect the touch points. In this way, the touch inputting resolution can be enhanced and the amount of the light emitters and the light receivers can be reduced, however, not only the problem of additional space requirement can not be solved, but also some new problems such as complicated calculations and the reflector of the border should be positioned precisely are occurred.

Therefore, the invention provides an optical touch apparatus and operating method thereof to solve the aforementioned problems.

SUMMARY OF THE INVENTION

An embodiment of the invention is an optical touch apparatus. In this embodiment, the optical touch apparatus includes an inputting interface, an optical module, a light receiving module, and a processing module. The inputting interface includes a surface and a light transmitting unit under the surface. The optical module and the light receiving module are set on a first side and a second side of the inputting interface. The optical module receives an incident beam and generates a plurality of parallel sensing lights according to the incident beam. When the plurality of parallel sensing lights pass the light transmitting unit to the light receiving module, the light receiving module generates a sensing result according to the condition the light receiving module receives the plurality of sensing lights. The processing module determines a touch point position formed on the surface according to the sensing result.

Another embodiment of the invention is an optical touch apparatus operating method. In this embodiment, the optical touch apparatus includes an input interface, a first optical module, a first light receiving module, and a processing module, the input interface includes a surface and a light transmitting unit under the surface, the first optical module is set at a first side of the input interface, and the first light receiving module is set at a second side opposite to the first side. The method includes the steps of: (a) the first optical module receiving a first incident beam and generating and emitting a plurality of parallel first direction sensing lights according to the first incident beam; (b) when the plurality of first direction sensing lights passes the light transmitting unit of the input interface toward the first light receiving module, the first light receiving module generating a first sensing result according to the condition the first light receiving module receiving the plurality of first direction sensing lights; (c) the processing module determining a position of a touch point according to the first sensing result.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

Figure 4A:
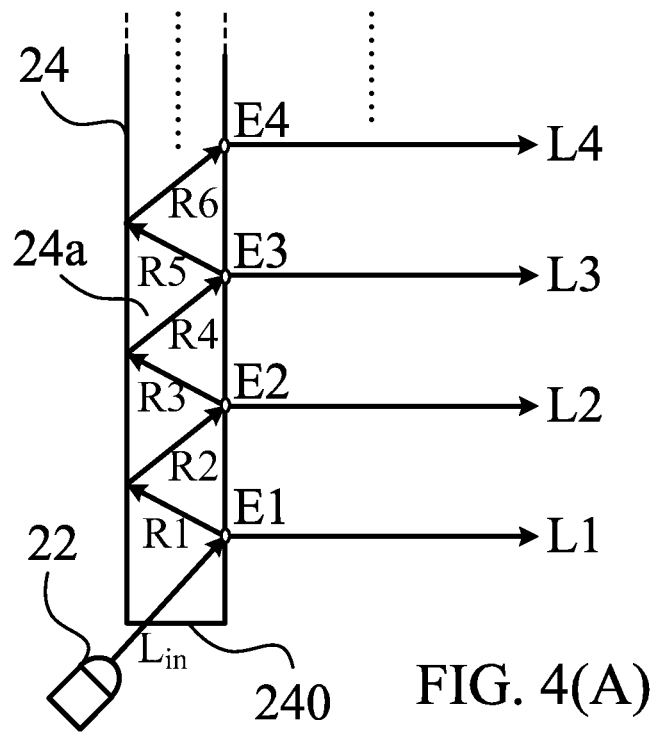
Figure 4B:
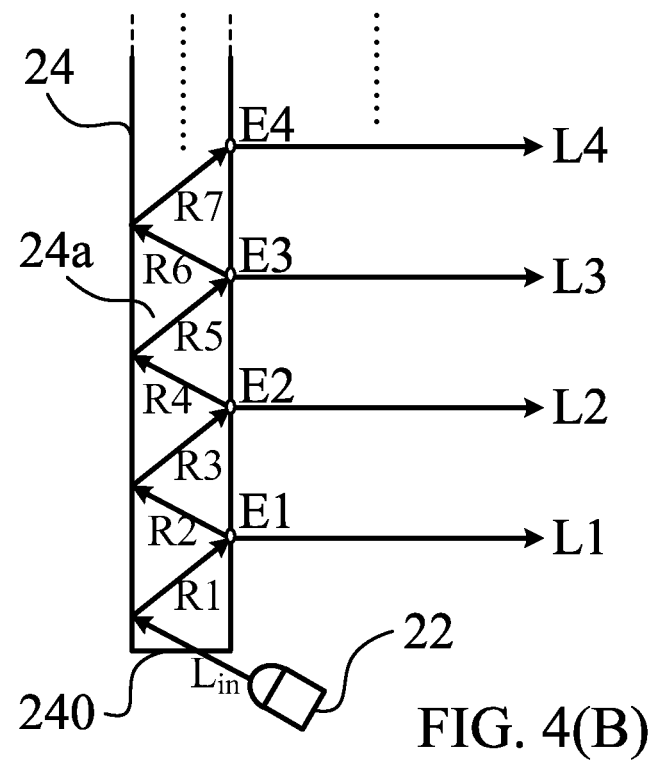
Figure 4C:
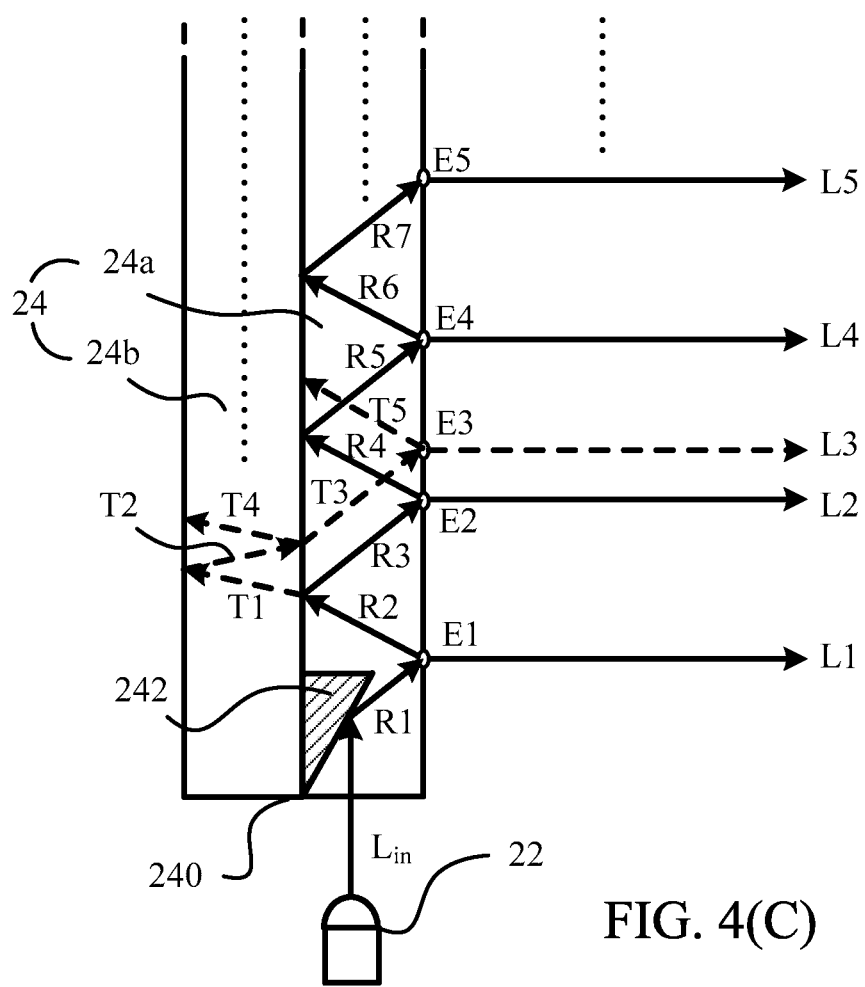

FIG. 4(A)~FIG. 4(C) illustrate scheme diagrams of different optical module operating conditions.

Figure 5A:
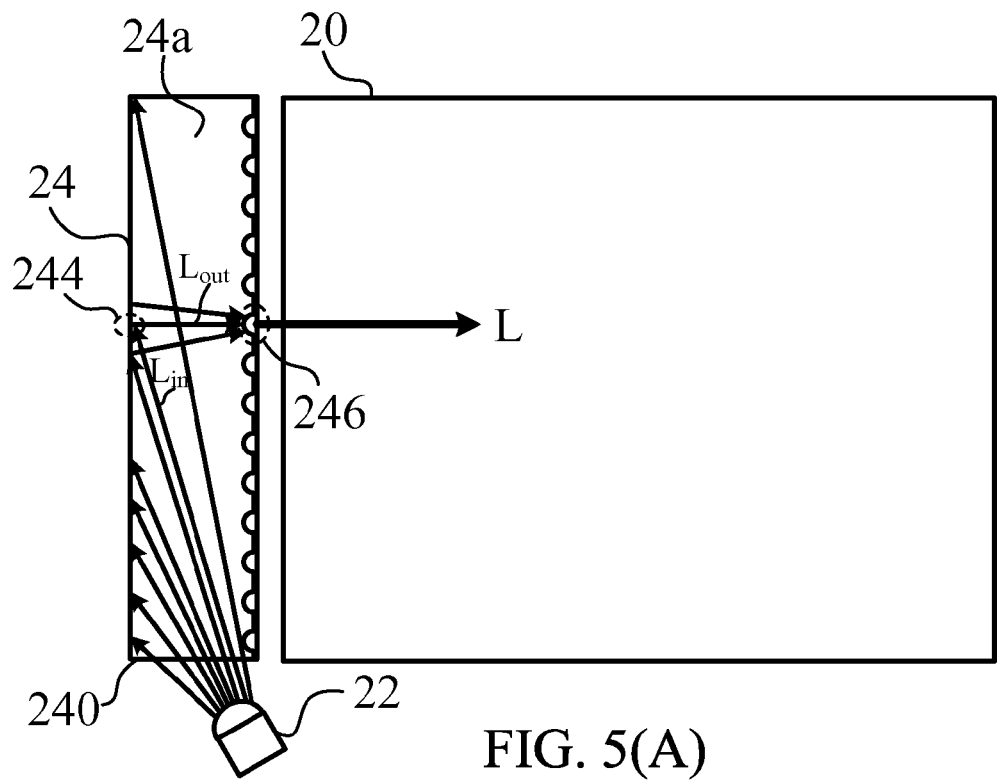
Figure 5B:
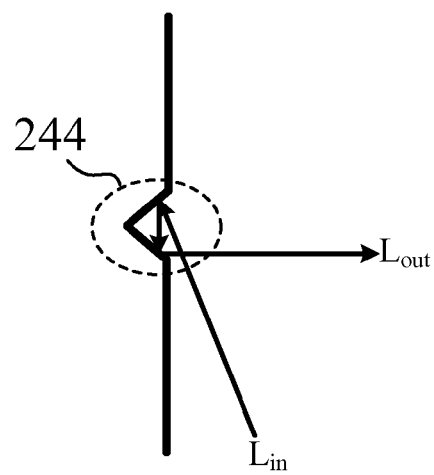

FIG. 5(A) and FIG. 5(B) illustrate scheme diagrams of the optical module including a concave part and a light condensing unit.

FIGS. 6(A)~(F) illustrate scheme diagrams of the sensing light $L_{in}$ transmitted in the light transmitting unit.

Figure 7:
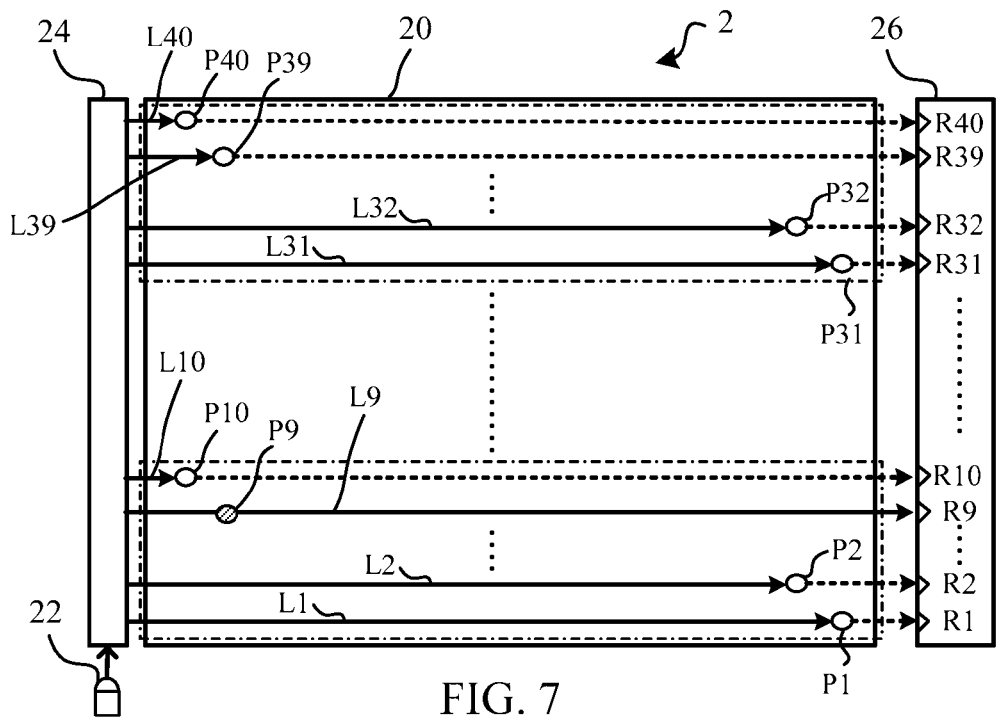

FIG. 7 illustrates a scheme diagram of the input interface used for inputting touch information.

Figure 8:
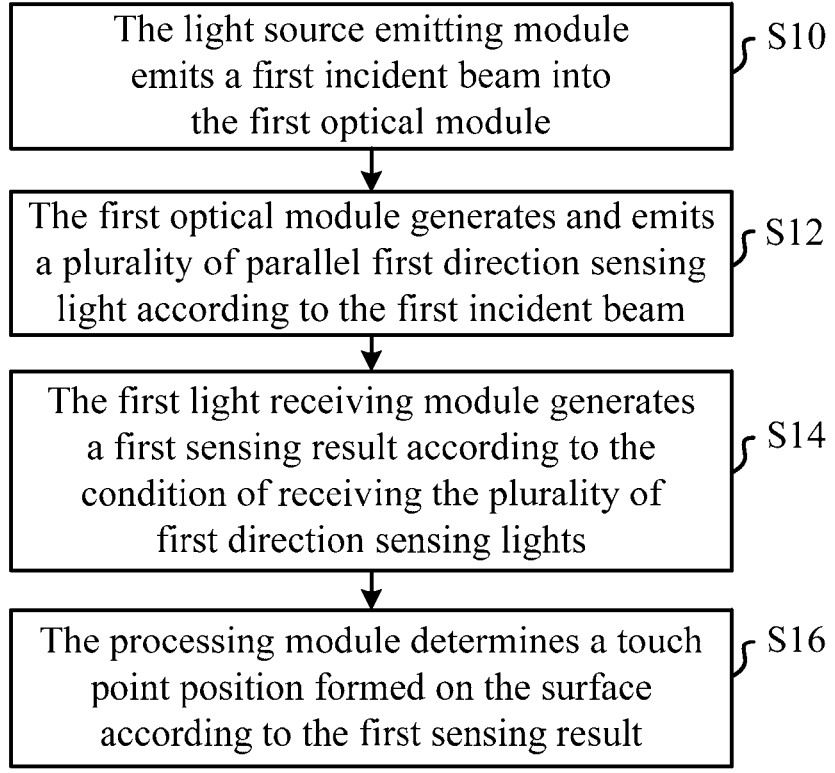

FIG. 8 illustrates a flowchart of the optical touch apparatus operating method in another embodiment of the invention.

DETAILED DESCRIPTION OF THE INVENTION

Figure 1:
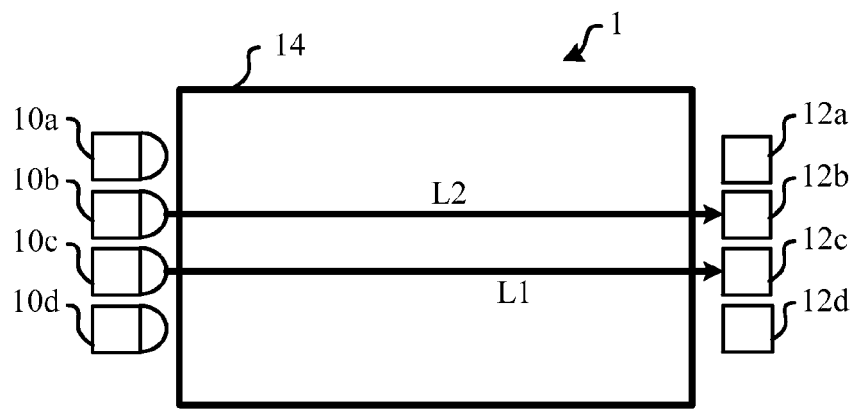
FIG. 1 illustrates a scheme diagram of the conventional optical touch apparatus.
Figure 2:
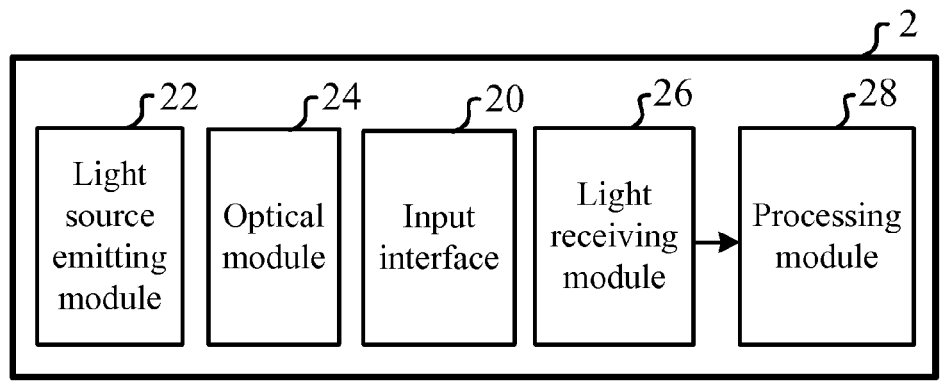
FIG. 2 and FIG. 3 illustrate a functional block diagram and a scheme diagram of the optical touch apparatus in the first embodiment of the invention respectively.
Figure 3:
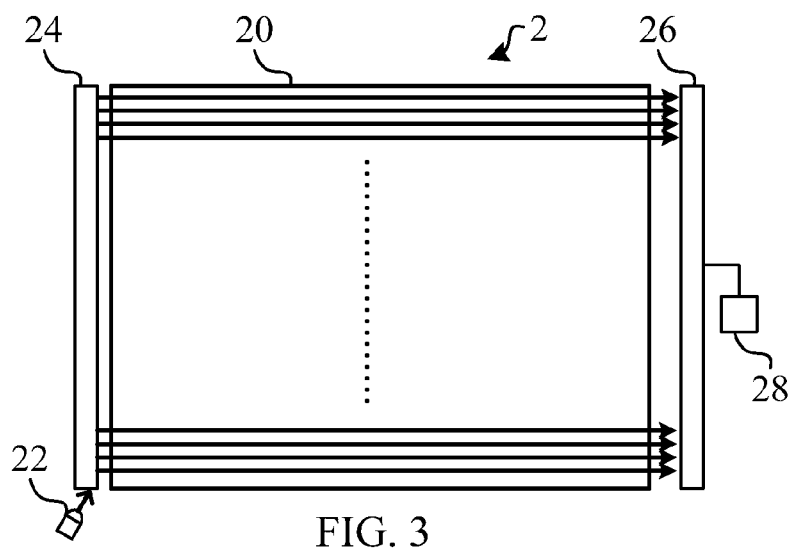

An embodiment of the invention is an optical touch apparatus. In this embodiment, the optical touch apparatus can be applied to the liquid crystal display apparatus or other display apparatus to have functions of displaying and touch inputting, but not limited to this case. Please refer to FIG. 2 and FIG. 3. FIG. 2 and FIG. 3 illustrate a functional block diagram and a scheme diagram of the optical touch apparatus respectively. As shown in FIG. 2, the optical touch apparatus 2 includes an input interface 20, a light source emitting module 22, an optical module 24, a light receiving module 26, and a processing module 28. Wherein, the light receiving module 26 is coupled to the processing module 28. As shown in FIG. 3, the optical module 24 and the light receiving module 26 are set at the left side and the right side of the input interface 20 respectively; the light source emitting module 22 is set outside the optical module 24. When the light source emitting module 22 emits an incident beam into the optical module 24, the incident beam will be reflected several times in the optical module 24, and then the optical module 24 will emit a plurality of parallel sensing lights rightward.

Then, the plurality of parallel sensing lights will pass the input interface 20 and emitted toward the light receiving module 26. When the plurality of parallel sensing lights is transmitted in the input interface 20, the transmitting states of the sensing lights may be changed by the touch of an object (e.g., a finger), and the sensing light receiving condition of the light receiving module 26 will be changed accordingly. Therefore, the light receiving module 26 can generate a sensing result according to the condition of receiving the plurality of sensing lights. At last, the processing module 28 will determine the position of the touch point formed on the surface of the input interface 20 according to the sensing result to achieve the purpose of determining touch points.

In practical applications, the position of the light source emitting module 22 set outside the optical module 24 has no specific limitations; the only condition is that the incident beam emitted from the light source emitting module 22 can smoothly pass the inlet 240 of the optical module 24 into the optical module 24. That is to say, the incident beam emitted from the light source emitting module 22 can be emitted into the optical module 24 from any directions outside the inlet 240. Please refer to FIGS. 4(A)~(C). In FIG. 4(A), the incident beam $L_{in}$ is emitted into the optical module 24 from the left outside the inlet 240; in FIG. 4(B), the incident beam $L_{in}$ is emitted into the optical module 24 from the right outside the inlet 240; in FIG. 4(C), the incident beam $L_{in}$ is emitted into the optical module 24 from the front outside the inlet 240, and the types and number of the light source of the light source emitting module 22 have no specific limitations and can be determined based on actual needs.

Taking FIG. 4(A) as an example, after the light source emitting module 22 emits the incident beam $L_{in}$ from the left outside the inlet 240 of the optical module 24 into the optical module 24, since the refraction index of the light transmitting layer 24a in the optical module 24 is appropriately designed, so that a refraction index difference will exist between the light transmitting layer 24a and the external medium. When the incident beam $L_{in}$ is emitted to E1 of the right side surface of the boundary of the light transmitting layer 24a and the external medium, a first direction sensing light L1 penetrating outward and a reflected light R1 reflected inward will be generated respectively. Then, when the reflected light R1 is reflected to the left side surface of the light transmitting layer 24a, the left side surface will reflect the reflected light R1 to form the reflected light R2. In the same way, when the reflected light R2 is emitted to E2 of the right side surface, a first direction sensing light L2 penetrating outward and a reflected light R3 reflected inward will be generated respectively. And, the first direction sensing lights L3 and L4 will be emitted from E3 and E4 of the right side surface respectively, and so on. Therefore, since the incident beam $L_{in}$ is reflected several times in the light transmitting layer 24a of the optical module 24, so that the optical module 24 can emit a plurality of parallel first direction sensing light. Similarly, the refraction index of the light transmitting layer 24a in the optical module 24 shown in FIG. 4(B) is also appropriately designed, so that a refraction index difference will exist between the light transmitting layer 24a and the external medium. The difference between FIG. 4(B) and FIG. 4(A) is that when the incident beam $L_{in}$ is emitted into the light transmitting layer 24a, the incident beam $L_{in}$ will be emitted to the left side surface of the light transmitting layer 24a firstly, and then the left side surface will reflect the incident beam $L_{in}$ to be a reflected light R1, and the reflected light R1 will be emitted to E1 of the right side surface, so that the first direction sensing light L1 penetrating outward and the reflected light R2 reflected inward will be generated respectively, and so on.

As shown in FIG. 4(C), the incident beam $L_{in}$ is emitted into the optical module 24 from the front outside the inlet 240, the optical module 24 includes the adjacent transmitting layers 24a and 24b having different refraction indexes. An auxiliary reflection unit 242 is set on the left side surface of the light transmitting layer 24a for reflecting the incident beam $L_{in}$ to form the reflected light R1 to E1 of the right side surface of the light transmitting layer 24a. It should be noticed that the number, shape, and position of the auxiliary reflection unit 242 can be determined based on practical needs without any limitations.

Because there is a refraction index difference existed between the refraction index of the light transmitting layer 24a and the refraction index of the external medium, the first direction sensing light L1 penetrating outward and the reflected light R2 reflected inward will be generated on E2. When the reflected light R2 is emitted to the left side surface of the light transmitting layer 24a, the refracted light T1 emitted into the light transmitting layer 24b and the reflected light R3 emitted to E2 of the right side surface of the light transmitting layer 24a will be generated respectively. When the reflected light R3 is emitted to E2 of the right side surface of the light transmitting layer 24a, the first direction sensing light L2 penetrating outward and the reflected light R4 reflected inward will be generated respectively. In addition, when the refracted light T1 enters into the light transmitting layer 24b to the left side surface of the light transmitting layer 24b, the refracted light T1 will be reflected to form the reflected light T2. When the reflected light T2 is emitted to the right side surface of the light transmitting layer 24b, the refracted light T3 emitted into the light transmitting layer 24a and the reflected light T4 will be generated respectively. When the refracted light T3 is emitted to E3 of the right side surface of the light transmitting layer 24a, the first direction sensing light L3 penetrating outward and the reflected light T5 reflected inward will be generated respectively, sans so on.

From the example shown in FIG. 4(C), with the first light transmitting layer 24a and the second light transmitting layer 24b with different refraction indexes, the distribution density of the parallel sensing lights emitted from the optical module 24 (e.g., the first direction sensing light L3) can be effectively enhanced to achieve touch determination with high resolution. It should be noticed that the number and the refraction index of the light transmitting layers included by the optical module 25 can be determined based on actual needs without any limitations.

In fact, in order to achieve better light condensing effect, the optical module 24 can further include a light condensing unit and a concave part. For example, as shown in FIG. 5(A), the incident beam $L_{in}$ emitted from the light source emitting module 22 will be emitted from the inlet 240 of the optical module 24 into the optical module 24. In this case, the incident beam $L_{in}$ is a spreading beam and includes a plurality of incident lights. When the plurality of incident lights is emitted to the left side surface of the light transmitting layer 24a, one incident light $L_{in}$ of the plurality of incident lights is emitted to the concave part 244 on the left side surface. Please refer to FIG. 5(B). FIG. 5(B) shows the detailed scheme diagram of the concave part 244. As shown in FIG. 5(B), when the incident light $L_{in}$ is emitted to the concave part 244, the concave part 244 will reflect the incident light $L_{in}$ twice to form the sensing light $L_{out}$. Then, after the light condensing unit 246 on the right side surface of the light transmitting layer 24a receives the sensing light $L_{out}$ and its several neighboring sensing lights, the light condensing unit 246 will focus these sensing lights to form the first direction sensing light L. In practical applications, the light condensing unit 246 can be optical lens or any apparatuses with light condensing function. And, the shape and number of the concave part 244 can be determined based on the actual relative positions between the concave part 244 and the light condensing unit 246 without any limitations.

Figure 6A:
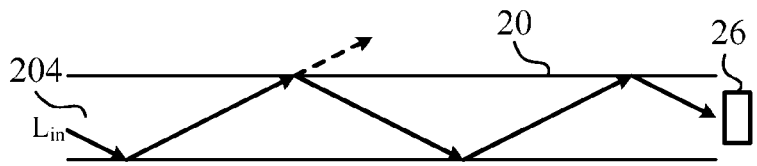

Next, the transmitting conditions of the plurality of parallel sensing lights emitted from the optical module 24 passing the input interface 20 to the light receiving module 26 will be discussed. As shown in FIG. 6(A), it is assumed that there is no opening of the surface of the input interface 20 existed in the transmitting path of the sensing light $L_{in}$ in the light transmitting unit 204, then the sensing light $L_{in}$ can be received by the light receiving module 26 and the light receiving module 26 will generate a sensing result. When the sensing light $L_{in}$ is emitted to the surface of the input interface 20, a part of sensing light $L_{in}$ may pass the surface of the input interface 20 and emit out, but its strength may be weaker.

Figure 6B:
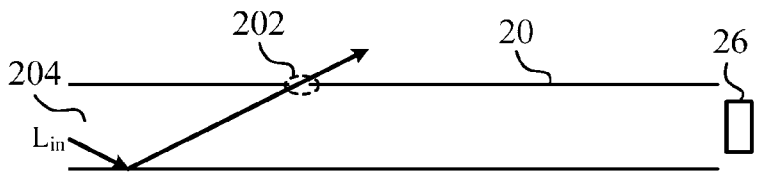
Figure 6C:
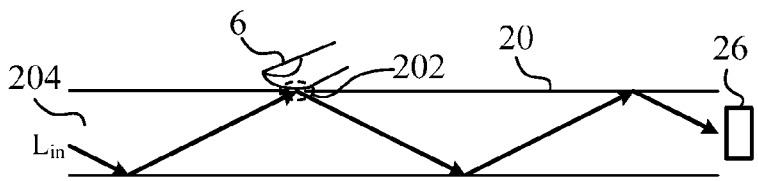
Figure 6D:
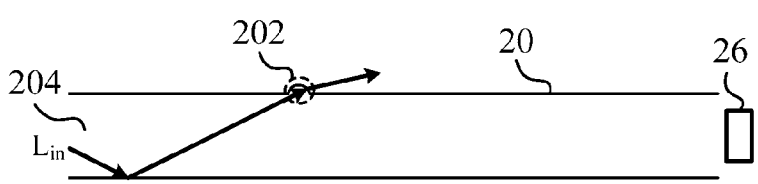
Figure 6E:
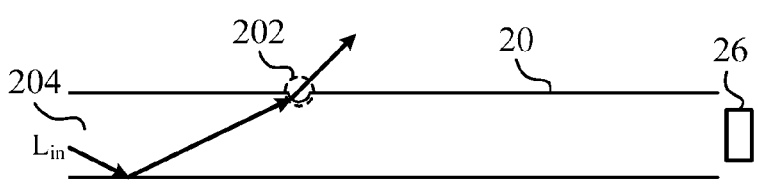
Figure 6F:
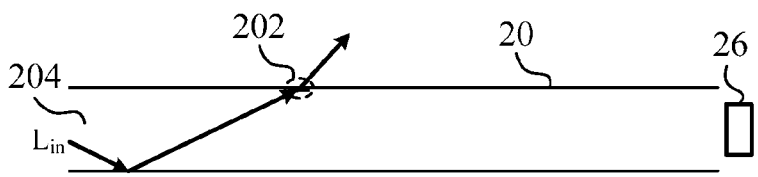

As to FIGS. 6(B)~(F), the adjusting unit 202 is set on the surface of the input interface 20, actually, the adjusting unit 202 can be an opening (as shown in FIGS. 6(B) and (C)), a convex part (as shown in FIG. 6(D)), a concave part (as shown in FIG. 6(E)), a material layer with thickness different from the surface of the input interface 20, there is no specific limitations. For example, as shown in FIG. 6(B), the adjusting unit 202 set on the surface of the input interface 20 is an opening, if the sensing light $L_{in}$ encounters the adjusting unit (the opening) 202 of the surface of the input interface 20 in the transmitting path in the light transmitting unit 204, since the adjusting unit 202 shown in FIG. 6(B) is not blocked by the finger of the user or other objects, therefore, the sensing light $L_{in}$ will be emitted out of the input interface 20 from the adjusting unit 202, and the light receiving module 26 will fail to receive the sensing light $L_{in}$. If the finger 6 of the user blocks the adjusting unit 202, as shown in FIG. 6(C), when the sensing light $L_{in}$ is emitted to the adjusting unit 202, since the adjusting unit 202 is blocked by the finger 6, so that the sensing light $L_{in}$ can be further transmitted in the light transmitting unit 204 and smoothly received by the light receiving module 26 to generate the sensing result. It should be noticed that except the above-mentioned operating mode, another possible operating mode is: the sensing light $L_{in}$ transmitted in the input interface 20 can be received by the light receiving module 26 under most conditions, only when the sensing light $L_{in}$ is transmitted to the adjusting unit 202 of the surface of the input interface 20, the sensing light $L_{in}$ can not be transmitted to the light receiving module 26. Therefore, the operating mode of the optical touch apparatus 2 of the invention has no specific limitations and can be adjusted based on actual needs.

It can be found from the examples shown in FIG. 6(B) and FIG. 6(C), since the sensing light transmitted in the light transmitting unit 204 can be changed by the input interface 20 based on whether the object blocks the corresponding adjusting unit (the opening) 202, therefore, it can be used for inputting touch information. For example, as shown in FIG. 7, the optical module 25 totally emits 40 parallel sensing lights L1~L40 transmitted in the light transmitting unit under the surface of the inputting interface 20. There are 40 adjusting units P1~P40 set on the surface of the input interface 20, and the 40 adjusting units P1~P40 are divided into a first set of adjusting units P1~P10, a second set of adjusting units P11~P20, a third set of adjusting units P21~P30, and a fourth set of adjusting units P31~P40. The adjusting units P1~P40 correspond to the parallel sensing lights L1~L40 respectively. The light receiving module 26 includes 40 receiving units R1~R40 used for receiving the sensing lights L1~L40 respectively. Taking the first set of adjusting units P1~P10 as example, since the adjusting units P1~P10 correspond to the parallel sensing lights L1~L10 respectively, and the distances between each adjusting unit P1~P10 and the light receiving module 26 are different, therefore, no matter one or more adjusting unit of the first set of adjusting units P1~P10 is blocked by the finger or other object, even the adjusting units blocked belong to different sets (e.g., the finger blocks the adjusting units P10 and P20 at the same time), the processing can still determine the position of the touch point accurately based on the different sensing results generated by the light receiving module 26. As to the second set of adjusting units P11~P20, the third set of adjusting units P21~P30, and the fourth set of adjusting units P31~P40 are all operated in the same way mentioned above.

As shown in FIG. 7, in this embodiment, if the finger of the user blocks the adjusting unit P9 of the first set adjusting units P1~P10, it means that the sensing light L9 corresponding to the adjusting unit P9 can be smoothly transmitted to the light receiving module 26 can received by the receiving unit R9 of the light receiving module 26 respectively. Since other adjusting units P1~P8 and P10~P40 are not blocked, therefore, their corresponding sensing lights L1~L8 and L10~L40 will be emitted out of the input interface 20 from corresponding adjusting units, and fail to be received by the light receiving module 26. Then, the light receiving module 26 will generate the sensing result according to whether the receiving units R1~R40 receive their corresponding sensing lights L1~L40 respectively for the processing module 28 to determine the touch points. It should be noticed that the optical module 24 and the light receiving module 26 are set at the left side and the right side of the input interface 20 respectively in the above-mentioned cases. However, in practical applications, the optical module 24 and the light receiving module 26 can be also set at the upper side and the lower side of the input interface 20 respectively. In addition, the first optical module and the first light receiving module can be set at the left side and the right side of the input interface 20, and the second optical module and the second light receiving module can be set at the upper side and the lower side of the input interface 20 to enhance the touch point detecting speed and accuracy of the optical touch apparatus 2. And, it can be applied to the condition that no adjusting units is set on the input interface 20 shown in FIG. 6(A), but not limited to this case.

Another embodiment of the invention is an optical touch apparatus operating method. In this embodiment, the optical touch apparatus includes an input interface, a first optical module, a first light receiving module, and a processing module. The input interface includes a surface and a light transmitting unit under the surface. The first optical module is set at a first side of the input interface, and the first light receiving module is set at a second side opposite to the first side. As shown in FIG. 8, at first, in step S10, the light source emitting module emits a first incident beam into the optical module. Next, in step S12, the first optical module generates and emits a plurality of parallel first direction sensing lights according to the first incident beam. When the plurality of first direction sensing lights passes the light transmitting unit of the input interface toward the first light receiving module, in step S14, the first light receiving module generates a first sensing result according to the condition of receiving the plurality of first direction sensing lights. As last, in step S16, the processing module determines a position of a touch point on the surface according to the first sensing result.

In practical applications, in order to achieve the 2-D touch point detection with high resolution, a second optical module and a second light receiving module can be further set at a third side of the input interface and a fourth side opposite to the third side in the optical touch apparatus. The method can further include the following steps. The second optical module receives a second incident beam and generates and emits a plurality of parallel second direction sensing lights according to the second incident beam, wherein the plurality of second direction sensing lights is approximately vertical to the plurality of first direction sensing lights. When the plurality of second direction sensing lights passes the light transmitting unit of the input interface to emit toward the second light receiving module, the second light receiving module generates a second sensing result according to the condition the second light receiving module receiving the plurality of second direction sensing lights. At last, the processing module determines the position o the touch point according to the first sensing result and the second sensing result.

Compared to the prior arts, the optical touch apparatus and the optical touch apparatus operating method of the invention can effectively decrease the number of light emitters/light receivers and the spaces they occupied via the light transmitting layers in the optical module and suitable design of refraction index, so that the distribution density of the sensing lights can be largely increased to achieve optical touch point detection with high resolution.

Although the present invention has been illustrated and described with reference to the preferred embodiment thereof, it should be understood that it is in no way limited to the details of such embodiment but is capable of numerous modifications within the scope of the appended claims.

What is claimed is:

1. An optical touch apparatus, comprising:
   an input interface comprising a surface and a light transmitting unit under the surface;
   a first optical module, set at a first side of the input interface, for receiving a first incident beam and generating a plurality of parallel first direction sensing lights according to the first incident beam;
   a first light receiving module, set at a second side of the input interface, the second side being opposite to the first side, when the plurality of first direction sensing lights passes the light transmitting unit of the input interface toward the first light receiving module, the first light receiving module generating a first sensing result according to the condition the first light receiving module receiving the plurality of first direction sensing lights; and
   a processing module, coupled to the first light sensing module, for determining a position of a touch point according to the first sensing result;
   wherein the first optical module comprises a first light transmitting layer, a refractive index difference existed between the first light transmitting layer and an external medium, when the first incident beam is emitted to a first surface at the boundary of the first light transmitting layer and the external medium, a first penetrating light penetrating outward and a first reflected light reflected inward will be generated respectively, the first penetrating light belongs to the plurality of first direction sensing lights, when the first reflected light is reflected to a second surface opposite to the first surface, the second surface will reflect the first reflected light to form a second reflected light, the first optical module further comprises a light condensing unit, the light condensing unit is set on the first surface, when a plurality of first incident lights of the first incident beam is emitted to the second surface, the second surface will reflect the plurality of first incident lights to the light condensing unit, the light condensing unit will condense the plurality of first incident lights to form the plurality of first direction sensing lights, a concave part is disposed on the second surface, when the plurality of first incident lights is emitted to the second surface, the concave part on the second surface will reflect at least one first incident light of the plurality of first incident lights to the light condensing unit on the first surface which is opposite to the second surface and near the first side of the input interface; and
   wherein the first optical module further comprises a second light transmitting layer and an auxiliary reflection unit, the auxiliary reflection unit is set on the second surface, the auxiliary reflection unit has an inclined plane to reflect the first incident light to the light condensing unit on the first surface, a refractive index difference also existed between the first light transmitting layer and the second light transmitting layer, the distribution density of the plurality of first direction sensing lights emitted from the first optical module will be increased through the design of the refractive indexes of the first light transmitting layer and the second light transmitting layer.

2. The optical touch apparatus of claim 1, further comprising:
   a light source emitting module, set outside an inlet of the first optical module, for emitting the first incident beam to pass the inlet into the first optical module.

3. The optical touch apparatus of claim 1, wherein when the second reflected light is emitted to the first surface, a second penetrating light penetrating outward and a third reflected light reflected inward will be generated respectively, the first penetrating light also belongs to the plurality of first direction sensing lights.

4. The optical touch apparatus of claim 1, wherein a plurality of openings is set on the surface of the input interface, the positions of the plurality of openings correspond to the plurality of first direction sensing lights respectively, when one of the plurality of first direction sensing lights is transmitted into the light transmitting unit, if an object on the surface blocks an opening corresponding to the first direction sensing light, then the first direction sensing light will be transmitted to the first light receiving module, and the first light receiving module will generate the first sensing result accordingly.

5. The optical touch apparatus of claim 4, wherein if the opening corresponding to the first direction sensing light is not blocked, the first direction sensing light will pass the opening to emit out of the input interface, the first light receiving module will generate the first sensing result according to the condition of failing to receive the first direction sensing light.

6. The optical touch apparatus of claim 1, further comprising:
   a second optical module, set at a third side of the input interface, for receiving a second incident beam and generating and emitting a plurality of parallel second direction sensing lights according to the second incident beam, the plurality of second direction sensing lights being approximately vertical to the plurality of first direction sensing lights; and
   a second light receiving module, set at a fourth side of the input interface, the fourth side being opposite to the third side, when the plurality of second direction sensing lights passes the light transmitting unit of the input interface to emit toward the second light receiving module, the second light receiving module generating a second sensing result according to the condition the second light receiving module receiving the plurality of second direction sensing lights;

wherein, the processing module determines the position of the touch point according to the first sensing result and the second sensing result.

7. A method of operating an optical touch apparatus, the optical touch apparatus comprising an input interface, a first optical module, a first light receiving module, and a processing module, the input interface comprising a surface and a light transmitting unit under the surface, the first optical module being set at a first side of the input interface, and the first light receiving module being set at a second side opposite to the first side, the method comprising the steps of:

the first optical module receiving a first incident beam and generating and emitting a plurality of parallel first direction sensing lights according to the first incident beam;

when the plurality of first direction sensing lights passes the light transmitting unit of the input interface toward the first light receiving module, the first light receiving module generating a first sensing result according to the condition the first light receiving module receiving the plurality of first direction sensing lights; and the processing module determining a position of a touch point according to the first sensing result;

wherein the first optical module comprises a first light transmitting layer, a refractive index difference existed between the first light transmitting layer and an external medium, when the first incident beam is emitted to a first surface at the boundary of the first light transmitting layer and the external medium, a first penetrating light penetrating outward and a first reflected light reflected inward will be generated respectively, the first penetrating light belongs to the plurality of first direction sensing lights, when the first reflected light is reflected to a second surface opposite to the first surface, the second surface will reflect the first reflected light to form a second reflected light, the first optical module further comprises a light condensing unit, the light condensing unit is set on the first surface, when a plurality of first incident lights of the first incident beam is emitted to the second surface, the second surface will reflect the plurality of first incident lights to the light condensing unit, the light condensing unit will condense the plurality of first incident lights to form the plurality of first direction sensing lights, a concave part is disposed on the second surface, when the plurality of first incident lights is emitted to the second surface, the concave part on the second surface will reflect at least one first incident light of the plurality of first incident lights to the light condensing unit on the first surface which is opposite to the second surface and near the first side of the input interface; and wherein the first optical module further comprises a second light transmitting layer and an auxiliary reflection unit, the auxiliary reflection unit is set on the second surface, the auxiliary reflection unit has an inclined plane to reflect the first incident light to the light condensing unit on the first surface, a refractive index difference also existed between the first light transmitting layer and the second light transmitting layer, the distribution density of the plurality of first direction sensing lights emitted from the first optical module will be increased through the design of the refractive indexes of the first light transmitting layer and the second light transmitting layer.

8. The method of claim 7, wherein the optical touch apparatus further comprises a light source emitting module set outside an inlet of the first optical module and used for emitting the first incident beam to pass the inlet into the first optical module.

9. The method of claim 7, wherein when the second reflected light is emitted to the first surface, a second penetrating light penetrating outward and a third reflected light reflected inward will be generated respectively, the first penetrating light also belongs to the plurality of first direction sensing lights.

10. The method of claim 7, wherein a plurality of openings is set on the surface of the input interface, the positions of the plurality of openings correspond to the plurality of first direction sensing lights respectively, when one of the plurality of first direction sensing lights is transmitted into the light transmitting unit, if an object on the surface blocks an opening corresponding to the first direction sensing light, then the first direction sensing light will be transmitted to the first light receiving module, and the first light receiving module will generate the first sensing result accordingly.

11. The method of claim 10, wherein if the opening corresponding to the first direction sensing light is not blocked, the first direction sensing light will pass the opening to emit out of the input interface, the first light receiving module will generate the first sensing result according to the condition of failing to receive the first direction sensing light.

12. The method of claim 7, wherein the optical touch apparatus further comprises a second optical module and a second light receiving module, the second optical module is set at a third side of the input interface, and the second light receiving module is set at a fourth side opposite to the third side, the method further comprises the steps of:

the second optical module receiving a second incident beam and generating and emitting a plurality of parallel second direction sensing lights according to the second incident beam, the plurality of second direction sensing lights being approximately vertical to the plurality of first direction sensing lights;

when the plurality of second direction sensing lights passes the light transmitting unit of the input interface to emit toward the second light receiving module, the second light receiving module generating a second sensing result according to the condition the second light receiving module receiving the plurality of second direction sensing lights; and the processing module determining the position of the touch point according to the first sensing result and the second sensing result.

* * * * *